United States Patent
Luking

(10) Patent No.: US 9,277,689 B2
(45) Date of Patent: Mar. 8, 2016

(54) MECHANISM FOR CONTROLLING POSITION OF DISCHARGE BLOCKING FLAP FOR ROTARY MOWING DECK

(76) Inventor: David William Luking, Louisville, KY (US)

(*) Notice: Subject to any disclaimer, the term of this patent is extended or adjusted under 35 U.S.C. 154(b) by 0 days.

(21) Appl. No.: 12/885,435

(22) Filed: Sep. 18, 2010

(65) Prior Publication Data

US 2012/0067019 A1    Mar. 22, 2012

(51) Int. Cl.
*A01D 34/71* (2006.01)

(52) U.S. Cl.
CPC ........................................ *A01D 34/71* (2013.01)

(58) Field of Classification Search
USPC .......................................................... 56/320.2
See application file for complete search history.

(56) References Cited

U.S. PATENT DOCUMENTS

| 4,395,865 | A | * | 8/1983 | Davis et al. | 56/13.3 |
| 5,133,175 | A | * | 7/1992 | Dumbrell | 56/17.4 |
| 5,826,417 | A | * | 10/1998 | Evans | 56/320.2 |
| 6,857,256 | B2 | * | 2/2005 | Strange et al. | 56/320.2 |
| 6,874,309 | B1 | * | 4/2005 | Bellis, Jr. | 56/320.2 |
| 2009/0031689 | A1 | * | 2/2009 | Nicholson | A01D 34/71 56/320.2 |

* cited by examiner

*Primary Examiner* — Alicia Torres

(57) ABSTRACT

A push and release operator control for selectively opening or closing the discharge blocking flap of a lawnmower. The first portion of travel of the actuator raises the discharge blocking flap toward its balance point. As the blocking flap reaches the balance point the actuator is released which allows the blocking flaps momentum to carry it through the balance point where gravity takes over to finish the travel. The actuator is reset by the blocking flaps motion after passing the balance point. Once the actuator is reset by the blocking flaps travel the same push and release of the actuator will return the blocking flap to it original starting position.

11 Claims, 4 Drawing Sheets

MECHANISM FOR CONTROLLING POSITION OF DISCHARGE BLOCKING FLAP FOR ROTARY MOWING DECK

BACKGROUND OF THE INVENTION

The present invention relates to a method for controlling the flow of clippings from the discharge opening of a rotary mowing deck on powered lawn mowing equipment.

Previous attempts to control the discharge of clippings are based on selectively placing a movable flap in the discharge path of the clippings; the position of the flap is controlled by the mower operator and requires one motion to block the discharge and a separate motion to allow the discharge. The prior approach of Bellis Jr. as set forth in U.S. Pat. No. 6,874,309 shows a hand operated blocking flap located adjacent to the operator station. The flap can be operated without affecting the speed of the mower however the operator is required to free one hand to operate the flap this can be a problem on lever operated mowers. The problem of having a free hand to operate a flap is over come by Exmark Mfg Co, U.S. Pat. No. 7,594,379 B2, they use a foot pedal to operate the flap. The Exmark design utilizes an over center locking pedal to hold the flap in the closed position with separate release pedal to return the flap to the open position. The Exmark design allows the pedal to be partially depressed to feather the flow of clippings. There are disadvantages to the over center design. For example; the over center mechanism is complicated with many moving parts these can become clogged with debris from mowing causing the pedal to loose functionality; having an independent release forces the operator to recall which pedal to push to move the flap to the desired position. It would be desirable to have a single pedal that would open or close the blocking flap. In addition if the same pushing motion of the pedal could open or close the flap it would make it very simple to operate the flap.

DEFINITIONS

Throughout the application the following terms are used as defined below.
  (a) Flap refers to the devise that physically covers the discharge opening to block clippings from exiting the mowing deck through the discharge opening.
  (b) Pedal refers to the foot operated device used to engage and disengage the flap
  (c) TDC refers to top dead center which is the balance point when the flap will stand held only by gravity and the connecting pin friction assuming the mower is on essentially level ground.
  (d) Forward direction is defined as the direction of travel the flap moves when the pedal is initially pushed.

SUMMARY OF THE INVENTION

The present invention is for a foot operated blocking flap for use on a rotary mower to control discharge of grass clippings and debris.

More specifically the invention allows control of the blocking flap with a single pedal. One aspect of the present invention is comprised of pivoting foot pedal, a linkage, a set of pivot joints and a pivoting flap. The configuration of the elements is such that when the pedal is fully depressed the flap is held in a balanced position between fully open and fully closed. Upon release of the pedal with the flap held still said flap and pedal will hold stationary. With the introduction of momentum the flap will tend to travel past the balance point on to the next stop raising the foot pedal as it goes. Once the flap is on the next stop the foot pedal can again be pushed to start the flap moving again only in the opposite direction.

BRIEF DESCRIPTION OF THE DRAWINGS

A better understanding of the invention will be had upon reference to the following description in conjunction with the accompanying drawings in which like numerals refer to like parts and wherein.

DETAILED DESCRIPTION OF THE PREFERRED EMBODIMENT

Figure 1:
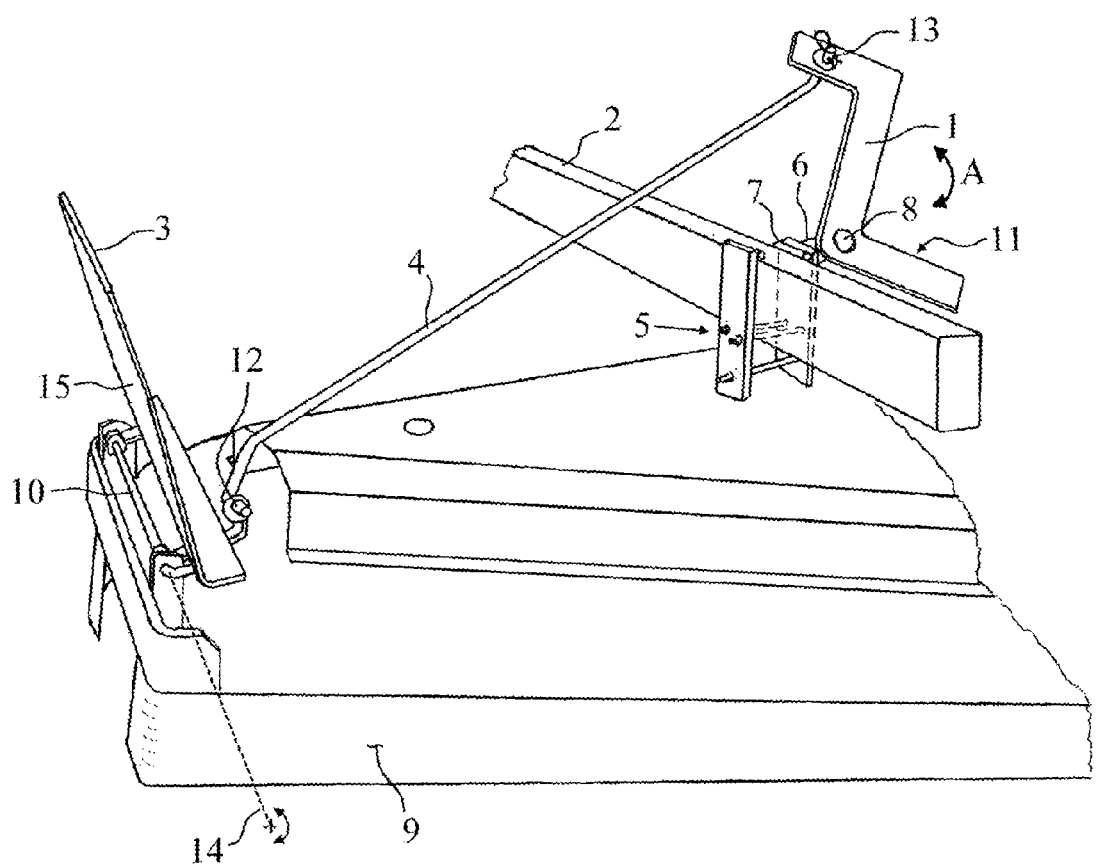
FIG. 1 is a perspective view depicting a partial mowing deck, the right frame member of the operator station, and the invention.
Figure 4:
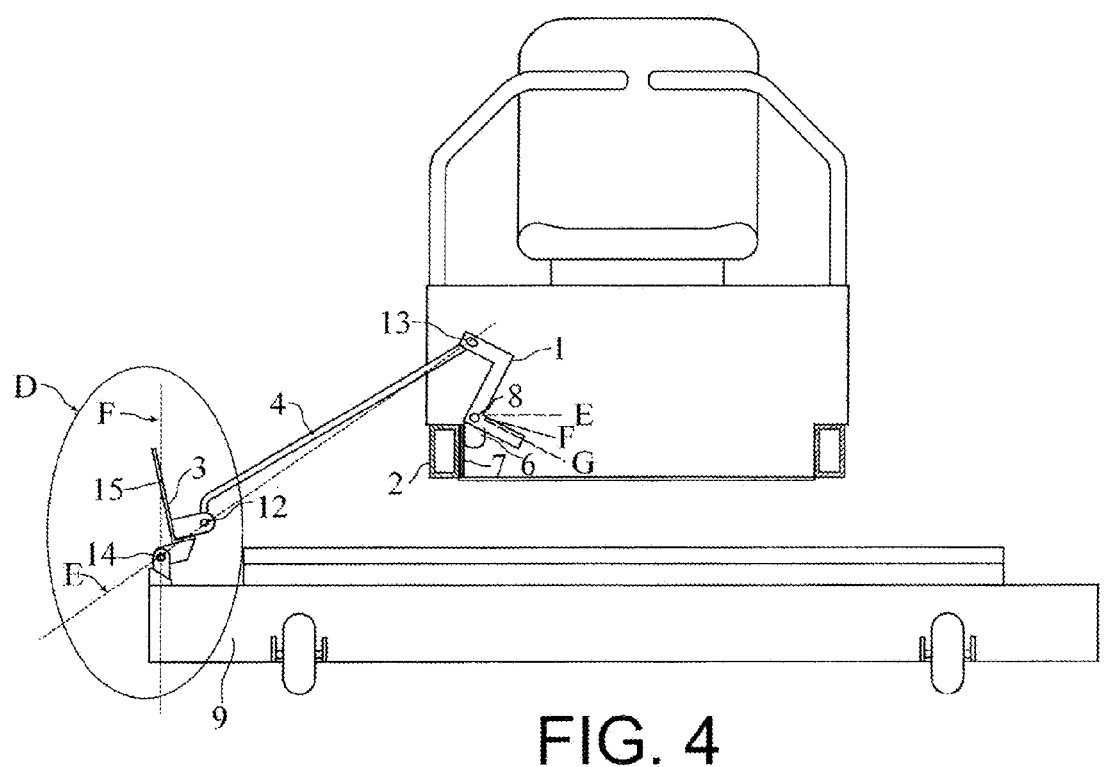

The preferred embodiment. Referring to FIG. 1 the invention is composed of foot pedal 1, mounted to mower frame 2, flap 3 mounted to mowing deck 9 and linkage 4 connecting flap 3 to pedal 1. Pedal 1 is pivotally journalled to mount 7 by the pedal shaft 8, the axis of rotation for pedal shaft 8 is perpendicular to the main body of pedal 1. The mount 7 is attached to the mower frame 2 by clamping force or bolts, refer to FIG. 1 clamp assembly 5. The Journal 6 is attached to the inner mounting plate 7 at a 30 degree angle from level in the vertical plain. The linkage 4 is pivotally connected to foot pedal 1 at connecting joint 13, flap 3 is pivotally connected to linkage 4 at joint 12. Flap 3 is pivotally journalled to mower deck 9 by rod 10. As force is applied to pedal 1 at point 11 it rotates about shaft 8 in direction A as indicated in FIG. 1. Referring to FIG. 4, Force is transferred to flap 3 via linkage 4 causing flap 3 to rotate until the connecting joint 12 aligns in plane E formed by flap axis of rotation 14 and the connection joint 13 of the pedal. At this configuration the center of gravity 15 of flap 3 will lie in plane F formed by the flap axis of rotation 14 and extending perpendicular to the plane of the mowing deck 9. On level ground flap 3 would balance and stand in the position of TDC.

Figure 2:
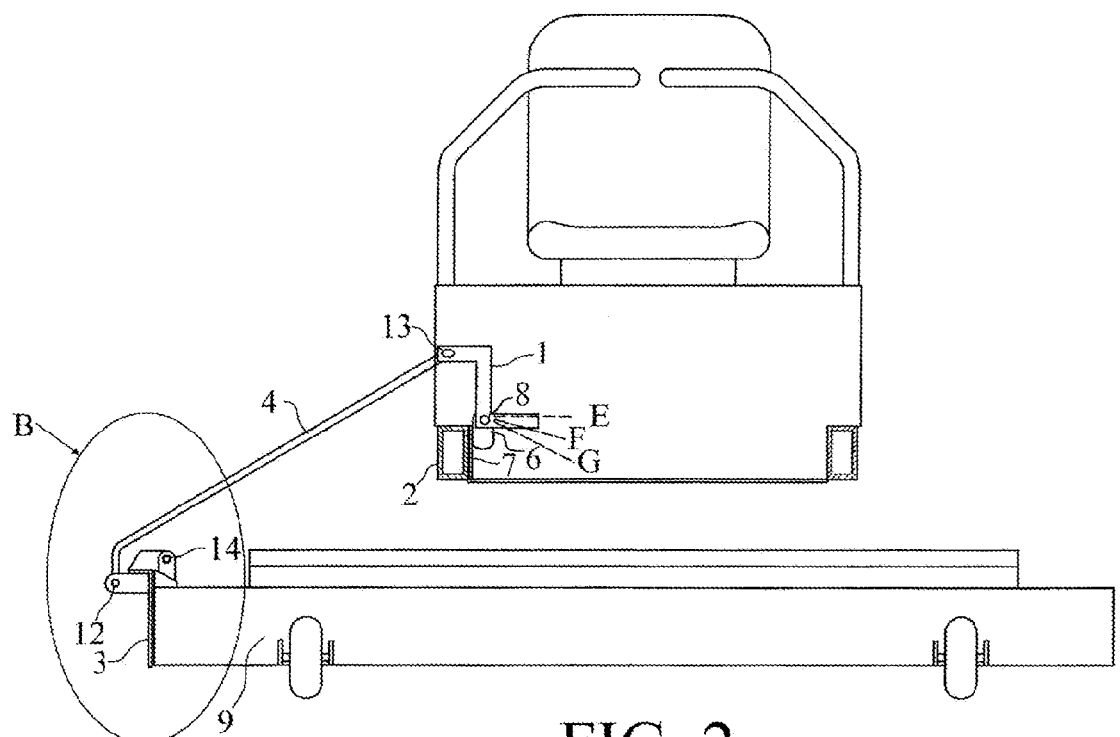
FIG. 2 is a side elevation view showing the flap and foot pedal with the flap in the closed position
Figure 3:
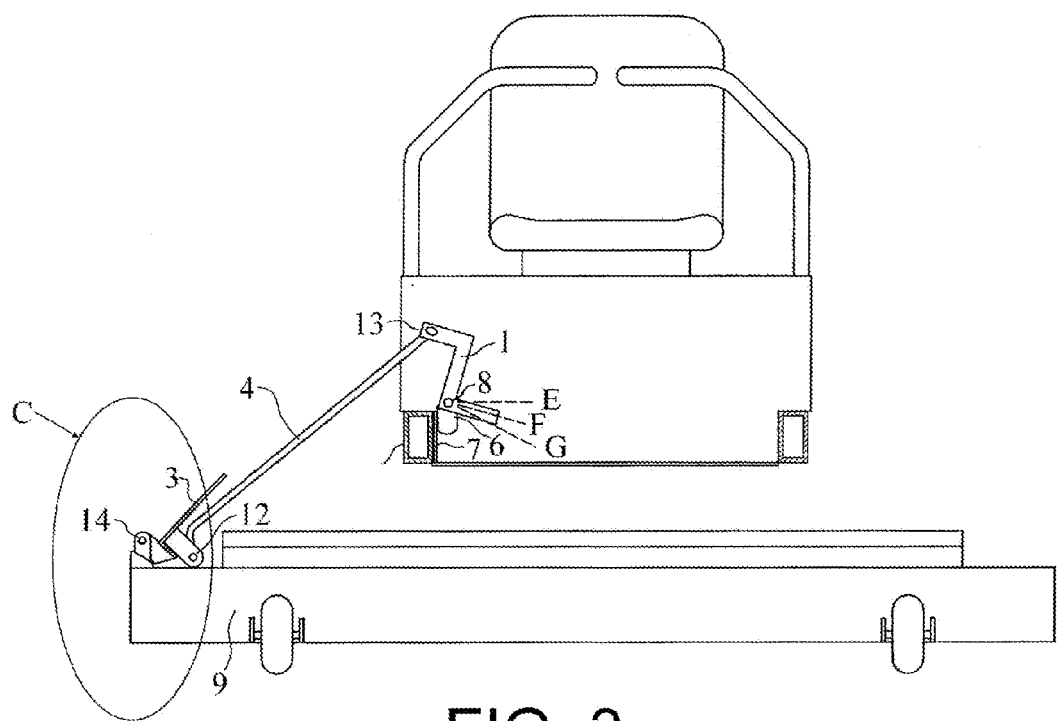
FIG. 3 is a side elevation view showing the flap and foot pedal with the flap in the open position and FIG. 4 is a side elevation view showing the flap and foot pedal with the flap in the TDC position.

Referring to FIGS. 2, 3, and 4, flap 3 is moved from blocking position B, FIG. 2, to open position C, FIG. 3, by applying and releasing pressure on pedal 1 at point 11. Starting in position B, FIG. 2, pressure is applied to pedal 1, flap 3 rotates in the clockwise direction toward TDC position D, FIG. 4, as flap 3 reaches TDC position D, FIG. 4, pedal 1 reaches rotation position G where pedal pressure is released to allow forward momentum to carry flap 3 through the TDC position D, FIG. 4, to open position C, FIG. 3, and pedal 1 from position G to position F.

To return flap 3 to blocking position B, FIG. 2, the same push and release motion is applied to pedal 1, point 11. Starting from position C, FIG. 3, pressure is applied to pedal 1, flap 3 rotates in the counter-clockwise direction toward TDC position D, FIG. 4, as flap 3 reaches TDC position D, FIG. 4, pedal 1 reaches rotation position G where pedal pressure is released to allow forward momentum to carry flap 3 through the TDC position D, FIG. 4, to closed position B, FIG. 2, and pedal 1 from position G to position E.

What is claimed is:

1. An apparatus for controlling movement of a pivotally mounted blocking plate located on a discharge opening of a cutting deck on a rotary lawn mower, comprising:
   a blocking plate mounted pivotally to the cutting deck at the discharge opening, wherein the blocking plate is configured to rotate along a rotational path between an open position and a closed position such that, in the closed position, the blocking plate substantially prevents discharge of clippings from the cutting deck and, in the open position, the blocking plate substantially clears the discharge opening, allowing discharge of clippings from the cutting deck;
   a fixed first pivot joint with an axis of rotation, wherein the first pivot joint connects the blocking plate to the cutting deck;
   a balance position along the rotational path of the blocking plate between the closed position and the open position, wherein the blocking plate will remain in the balance position without application of an external force;
   a converting means for converting a motion supplied by a mower operator into a pulling force; and
   a connecting means for transferring the pulling force to the blocking plate;
   wherein the mower operator can control the position of the blocking plate using the pulling force to alternately rotate the blocking plate in a forward direction from the open position to the closed position and in a reverse direction from the closed position to the open position; and
   wherein the converting means is operatively connected to the connecting means.

2. The apparatus of claim 1 wherein the converting means comprises:
   a pedal including a contact surface for receiving pressure from the mower operator;
   a third joint linking the pedal to the connecting means; and
   a fixed fourth pivot joint pivotally connecting the pedal to the lawn mower;
   whereby the pulling force can be supplied by the mower operator by applying pressure to the contact surface.

3. The apparatus of claim 2, wherein the pedal is foot operated, and
   wherein the pulling force can be supplied by the mower operator's foot by applying pressure to the contact surface, thereby eliminating the need for the operator to reposition the foot or using two different motions to achieve the forward and reverse rotation of the blocking plate.

4. The apparatus of claim 1, wherein the connecting means is comprised of:
   a linkage member with a first end and a second end, the first end being connected pivotally to the blocking plate and the second end to be locally exposed to the pulling force by the mower operator; and
   a rotating second pivot joint connecting the first end of the linkage member to the blocking plate;
   wherein an axis of rotation of the second pivot joint is substantially parallel to the axis of rotation of the first pivot joint; and
   wherein, when the blocking plate is in motion, and when the axis of rotation of the second pivot joint lies in the plane extending between the second end of the linkage member and the axis of rotation of the first pivot joint, the blocking plate's rotational momentum will carry the blocking plate past the balance position;
   wherein the pulling force, applied axially at the second end of the linkage member and controlled by the mower operator, in cooperation with the blocking plate's momentum, will rotate the blocking plate in a reverse direction from the closed position past the balance position to the open position, the pulling force being cyclical and variable, the pulling force starting at zero when first applied and increasing to a maximum as the blocking plate approaches the balance position where the force is released, allowing the blocking plate's momentum to carry the blocking plate past the balance position to the open position, and
   wherein, the pulling force, applied axially at the second end of the linkage member and controlled by the mower operator, in cooperation with the blocking plate's momentum, will rotate the blocking plate in a forward direction from the open position past the balance point to the closed position, the pulling force being cyclical and variable, the pulling force starting at zero when first applied and increasing to a maximum as the blocking plate approaches the balance position where the force is released, allowing the blocking plate's momentum to carry the blocking plate past the balance position to the closed position.

5. The apparatus of claim 1, wherein the balance position is a position wherein the center of gravity of the blocking plate is positioned above the axis of rotation of the first pivot joint and the center of gravity lies in the force plane formed by the axis of rotation of the first pivot joint and gravity.

6. A method for controlling movement of a pivotally mounted blocking plate located at a discharge opening of a cutting deck of a rotary lawn mower, comprising:
   providing a blocking plate mounted pivotally to the cutting deck at a fixed first pivot joint at the discharge opening, wherein the blocking plate is configured to rotate along a rotational path between an open position and a closed position such that, in the closed position, the blocking plate substantially prevents discharge of clippings from the cutting deck and, in the open position, the blocking plate substantially clears the discharge opening allowing the discharge of clippings from the cutting deck;
   providing a blocking plate balance position along the rotational path of the blocking plate between the closed position and the open position, wherein the blocking plate will remain in the balance position without application of an external force; and
   providing a linkage member with a first end and a second end, the first end being connected pivotally to the blocking plate at a rotating second pivot joint and the second end to be locally exposed to a pulling force by a mower operator;
   wherein the second pivot joint is positioned such that an axis of rotation of the second pivot joint is substantially parallel to an axis of rotation of the first pivot joint; and
   wherein, when the blocking plate is in motion, and when the axis of rotation of the second pivot joint lies in the plane extending between the second end of the linkage member and the axis of rotation of the first pivot joint, the blocking plate's rotational momentum will carry the blocking plate past the balance position;
   wherein the pulling force, applied axially at the second end of the linkage member and controlled by the mower operator, in cooperation with the blocking plate's momentum, will rotate the blocking plate in a reverse direction from the closed position past the balance position to the open position, the pulling force being cyclical and variable, the pulling force starting at zero when first applied and increasing to a maximum as the blocking plate approaches the balance position where the force is released, allowing the blocking plate's momentum to carry the blocking plate past the balance position to the open position, and wherein, the pulling force, applied axially at the second end of the linkage member and controlled by the mower operator, in cooperation with the blocking plate's momentum, will rotate the blocking plate in a forward direction from the open position past the balance point to the closed position, the pulling force being cyclical and variable, the pulling force starting at zero when first applied and increasing to a maximum as the blocking plate approaches the balance position where the force is released, allowing the blocking plate's momentum to carry the blocking plate past the balance position to the closed position.

7. The method of claim 6, wherein the balance position is defined as a position where the center of gravity of the blocking plate is positioned above the axis of rotation of the first pivot joint and the center of gravity lies in the force plane formed by the axis of rotation of the first pivot joint and gravity.

8. The method of claim 6, wherein the second end of the linkage member is exposed to the pulling force supplied by the mower operator by:

provbenchmark a fourth pivotal connection between a foot pedal and the mower in an operator station area of the mower;

providing a contact surface on the foot pedal for receiving pressure from the mower operator, the contact surface being located on one side of the pivotal connection; and providing a means for connecting the foot pedal to the second end of the linkage member;

whereby the pulling force used to rotate the blocking plate in a forward direction or a reverse direction can be supplied by the mower operator's foot applying pressure to the pedal contact surface, thereby eliminating the need for repositioning the operator's foot or using two different motions to achieve forward and reverse rotation of the blocking plate.

9. An apparatus for controlling movement of a pivotally mounted blocking plate located in a discharge opening of a cutting deck on a rotary lawn mower comprising:

a blocking plate mounted pivotally to the cutting deck at the discharge opening, wherein the blocking plate is configured to rotate along a rotational path between an open position and a closed position such that, in the closed position, the plate substantially prevents the discharge of clippings from the cutting deck and, in the open position, the plate substantially clears the discharge opening, allowing the discharge of clippings from the cutting deck, the blocking plate having a balance position along the rotational path, wherein the blocking plate will remain in the balance position without application of an external force;

a fixed first pivot joint with an axis of rotation, wherein the first pivot joint connects the blocking plate to the cutting deck;

a linkage member with a first end and a second end, the first end being connected pivotally to the blocking plate and the second end to be locally exposed to a pulling force by a mower operator; and a rotating second pivot joint connecting the first end of the linkage member to the blocking plate, wherein an axis of rotation of the second pivot joint is substantially parallel to the axis of rotation of the first pivot joint; and wherein, when the blocking plate is in motion, and when the axis of rotation of the second pivot joint lies in the plane extending between the second end of the linkage member and the axis of rotation of the first pivot joint, the blocking plate's rotational momentum will carry the blocking plate past the balance position;

wherein the pulling force, applied axially at the second end of the linkage member and controlled by the mower operator, in cooperation with the blocking plate's momentum will rotate the blocking plate in a reverse direction from the closed position past the balance position to the open position, the pulling force being cyclical and variable, the variable pulling force starting at zero when first applied and increasing to a maximum as the blocking plate approaches the balance position where the force is released allowing the blocking plate's momentum to carry the blocking plate past the balance position to the open position, and wherein, the pulling force, applied axially at the second end of the linkage member and controlled by the mower operator, in cooperation with the blocking plate's momentum, will rotate the blocking plate in a forward direction from the open position past the balance point to the closed position, the pulling force being cyclical and variable, the pulling force starting at zero when first applied and increasing to a maximum as the blocking plate approaches the balance position where the force is released, allowing the blocking plate's momentum to carry the blocking plate past the balance position to the closed position.

10. The apparatus of claim 9, wherein the balance position is defined when the center of gravity of the blocking plate is positioned above the axis of rotation of the first pivot joint and the center of gravity lies in the force plane formed by the axis of rotation of the first pivot joint and gravity.

11. The apparatus of claim 9, wherein the second end of the linkage member has a foot pedal attached for supplying the pulling force, the foot pedal comprised of:

a third joint connecting the linkage member to the foot pedal;

a fixed fourth pivot joint pivotally connecting the foot pedal to the lawn mower; and a contact surface for receiving pressure from the mower operator's foot, the contact surface being located on one side of the fourth pivot joint, wherein the pulling force can be supplied by the mower operator's foot by applying pressure to the contact surface, thereby eliminating the need for the operator to reposition their foot or using two different motions to achieve the forward and reverse rotation of the blocking plate.

* * * * *